US006684248B1

(12) United States Patent
Janacek et al.

(10) Patent No.: US 6,684,248 B1
(45) Date of Patent: Jan. 27, 2004

(54) METHOD OF TRANSFERRING DATA FROM A SENDER TO A RECIPIENT DURING WHICH A UNIQUE ACCOUNT FOR THE RECIPIENT IS AUTOMATICALLY CREATED IF THE ACCOUNT DOES NOT PREVIOUSLY EXIST

(75) Inventors: Robert Janacek, East Hanover, NJ (US); Mahesh Muchhala, Kenilworth, NJ (US)

(73) Assignee: Certifiedmail.com, Inc., Springfield, NJ (US)

( * ) Notice: Subject to any disclaimer, the term of this patent is extended or adjusted under 35 U.S.C. 154(b) by 0 days.

(21) Appl. No.: 09/565,287

(22) Filed: May 2, 2000

Related U.S. Application Data

(60) Provisional application No. 60/132,203, filed on May 3, 1999, provisional application No. 60/132,790, filed on May 6, 1999, and provisional application No. 60/198,033, filed on Apr. 18, 2000.

(51) Int. Cl.[7] ........................ G06F 15/16; G06F 15/177

(52) U.S. Cl. ........................ 709/225; 709/230; 709/225; 709/217

(58) Field of Search ................................ 379/93; 707/1, 707/10, 201; 709/203, 206, 207, 224, 229, 247, 217, 220, 219, 222, 225, 230, 232

(56) References Cited

U.S. PATENT DOCUMENTS

| | | | | | |
|---|---|---|---|---|---|
| 5,230,048 | A | * | 7/1993 | Moy | 707/1 |
| 5,566,230 | A | | 10/1996 | Cairo | |
| 5,721,825 | A | * | 2/1998 | Lawson et al. | 709/203 |
| 5,781,901 | A | * | 7/1998 | Kuzma | 707/10 |
| 5,790,790 | A | | 8/1998 | Smith et al. | |
| 5,809,116 | A | | 9/1998 | Cairo | |
| 5,815,555 | A | | 9/1998 | Cairo | |
| D399,836 | S | | 10/1998 | Wu et al. | |
| 5,956,154 | A | | 9/1999 | Cairo | |
| 6,058,168 | A | * | 5/2000 | Braband | 379/93.24 |
| 6,092,199 | A | * | 7/2000 | Dutcher et al. | 713/201 |
| 6,128,655 | A | * | 10/2000 | Fields et al. | 709/219 |
| 6,182,131 | B1 | * | 1/2001 | Dean et al. | 709/222 |
| 6,192,407 | B1 | | 2/2001 | Smith et al. | |
| 6,275,850 | B1 | * | 8/2001 | Beyda et al. | 709/206 |
| 6,308,222 | B1 | * | 10/2001 | Krueger et al. | 709/247 |
| 6,389,472 | B1 | * | 5/2002 | Hughes et al. | 709/229 |
| 6,442,571 | B1 | * | 8/2002 | Haff et al. | 707/201 |
| 6,463,464 | B1 | * | 10/2002 | Lazaridis et al. | 709/207 |
| 6,487,599 | B1 | * | 11/2002 | Smith et al. | 709/229 |
| 6,490,620 | B1 | * | 12/2002 | Ditmer et al. | 709/224 |

FOREIGN PATENT DOCUMENTS

| | | | | |
|---|---|---|---|---|
| EP | 0838774 | | 4/1998 | |
| EP | 0869652 | | 10/1998 | |
| EP | 0907120 | | 4/1999 | |
| NL | 1006667 C6 | * | 1/1999 | G06F/17/60 |

OTHER PUBLICATIONS

Casey, T.; Roe, M.; Tuck, B.; Wilbur, S.; "Secure automated document delivery", Computer Security Applications Conference, 1989., Fifth Annual, Dec. 4–8, 1989, Page(s): 348–356.*

* cited by examiner

*Primary Examiner*—Thomas Lee
*Assistant Examiner*—James K. Trujillo
(74) *Attorney, Agent, or Firm*—Gibbons, Del Deo, Dolan, Griffinger & Vecchione

(57) ABSTRACT

A method is provided for secure transmission of a message via a network where a recipient of the message need not be a party to the network or maintain an active address in the network. Instead, new accounts are created dynamically by the system of the invention in response to a message addressed to an unknown user by sender who is a party to the network. In the operation of the method of the invention, messages from a network-party sender addressed to such an unknown user are deposited into a unique account created for the addressed recipient. That addressed recipient is notified via a non-network communication path that a message is stored and available to it at a network address, and is provided instructions for accessing that network address to retrieve its message.

24 Claims, 1 Drawing Sheet

METHOD OF TRANSFERRING DATA FROM A SENDER TO A RECIPIENT DURING WHICH A UNIQUE ACCOUNT FOR THE RECIPIENT IS AUTOMATICALLY CREATED IF THE ACCOUNT DOES NOT PREVIOUSLY EXIST

This application claims the benefit of U.S. Provisional Application No. 60/132,203 filed May 3, 1999, U.S. Provisional Application No. 60/132,790 filed May 6, 1999 and U.S. Provisional Application No. 60/198,033 filed Apr. 18, 2000, which are herein incorporated by reference.

FIELD OF THE INVENTION

The present invention relates to computer systems and more particularly to digital messages accessed by computer systems.

BACKGROUND OF THE INVENTION

The Internet is a worldwide system of computer networks—a network of networks in which a user at one computer can obtain information from any other computer (and communicate with users of the other computers). The Internet was conceived by the Advanced Research Projects Agency (ARPA) of the U.S. government in 1969 and was first known as the ARPANet. The original aim was to create a network that would allow users of a research computer at one university to be able to communicate with research computers at other universities. To assure that the network could continue to function even if parts of it were destroyed, such as by a military attack or natural disaster, a key design requirement of ARPANet was a facility for bi-directional message routing in a communication link.

The Internet has evolved into a public, cooperative, and self-sustaining facility accessible to hundreds of millions of people worldwide. The most widely used part of the Internet is the World Wide Web (often abbreviated "WWW" or called "the Web"). One important feature of the Web is its use of hypertext documents, a method of instant cross-referencing. On many Web sites, certain words or phrases appear in text of a different color than the rest; often this text is also underlined. When one of these words or phrases is selected, it functions as a hyperlink, transferring the user to the site or page that is linked to this word or phrase. Sometimes there are buttons, images, or portions of images that are "clickable."

Using the Web provides access to millions of pages of information. Web surfing is done with a Web browser; the most popular of which are Netscape Navigator and Microsoft Internet Explorer. The appearance of a particular Web site may vary slightly depending on the particular browser used. Recent versions of browsers have plug-ins, which provide animation, virtual reality, sound, music, and display of text in controlled form.

Because the Internet evolved from the ARPAnet, a research experiment that supported the exchange of data between government contractors and academic researchers, an on-line culture developed that is sometimes alien to the corporate business world. Although the Internet was not designed to make commercialization easy, commercial Internet publishing and e-commerce have rapidly evolved. In part it is the very ease with which anyone can publish a document that is accessible by a large number of people that makes electronic publishing attractive. Setting up an e-commerce site can typically be accomplished with low overhead while providing access to a worldwide market 24 hours a day. The growth and popularity of the Internet is providing new opportunities for commercialization including but not limited to Web sites driven by electronic commerce, ad revenue, branding, database transactions, and intranet/extranet applications.

Domain names direct where e-mail is routed, files are found, and computer resources are located. They are used when accessing information on the Web or connecting to other computers through Telnet. Internet users enter the domain name, which is automatically converted to the Internet Protocol address by the Domain Name System (DNS).

For many Internet users, electronic mail (e-mail) has substantially replaced the Postal Service for written transactions. E-mail is the most widely used application on the Internet. Live "conversations" can be carried on with other computer users, using Internet Relay Chat (IRC). More recently, Internet telephony hardware and software allows real-time voice conversations.

E-mail was one of the first services developed on the Internet. Today, e-mail is an important service on any computer network, not just the Internet. E-mail involves sending a message from one computer account to another computer account. E-mail is used to send textual information as well as files, including graphic files, executable files, word processing and other files. E-mail is becoming a popular way to conduct business over long distances. Using e-mail to contact a business associate can be more effective than using a voice telephone, because the recipient can read it at a convenient time, and the sender can include as much information as needed to explain the situation.

On-line commerce, or "e-commerce", uses the Internet, of which the Web is a part, to transfer large amounts of information about numerous goods and services in exchange for payment or customer data needed to facilitate payment. Potential customers can supply a company with shipping and invoicing information without having to tie up sales staff. The convenience offered to the customer is primarily that of avoiding a trip to one or more traditional "bricks and mortar" establishment in search of a desired product.

The expanding use of e-mail, FTP and other forms of digital message communication is widely displacing traditional paper communications. The Internet is an essential communications tool for individuals, professional users, companies, and government and military agencies. Global interconnectivity and rapid data transfer are among the benefits enjoyed its millions of users. While the Internet provides an undeniably useful environment for data exchange, security is not integrated into its design. In fact, the very concept behind the Internet is a robust open packet communication system.

Therefore, there is a need to provide a system for controlled message distribution.

SUMMARY OF THE INVENTION

A method is disclosed for secure transmission of a message via a network wherein a recipient of the message need not be a party to the network or maintain an active address in the network. Instead, new accounts are created dynamically by the system of the invention in response to a message addressed to an unknown user by sender who is a party to the network. In the operation of the method of the invention, messages from a network-party sender addressed to such an unknown user are deposited into a unique account created for the addressed recipient. That addressed recipient is notified via a non-network communication path that a message is stored and available to it, and is provided instructions for accessing a network address to retrieve its message.

DETAILED DESCRIPTION OF VARIOUS ILLUSTRATIVE EMBODIMENTS

Figure 1:
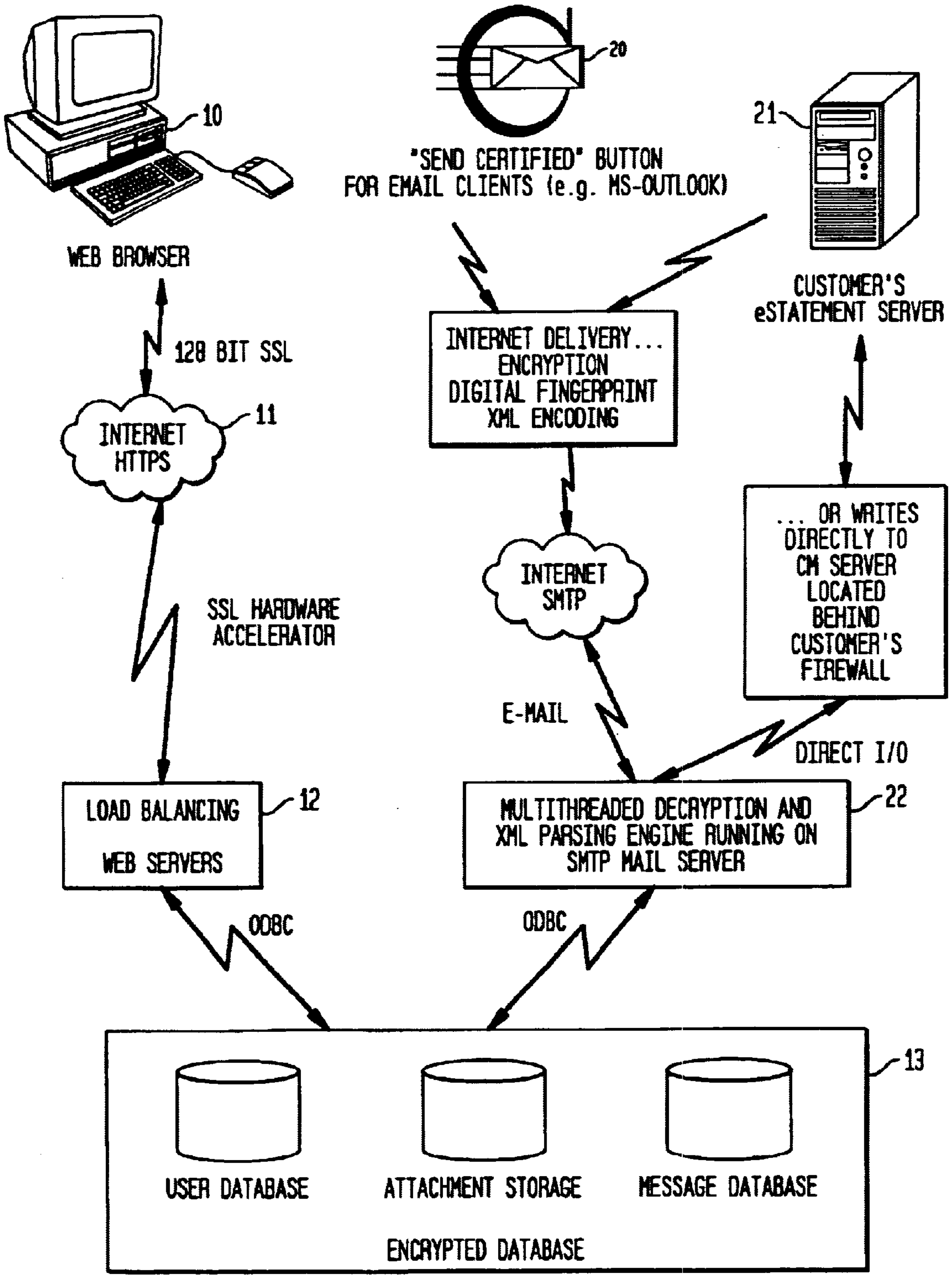
FIG. 1 depicts a system embodiment for carrying out the method of the invention.

Vendors, universities and government agencies have attempted to provide a system for controlled message distribution in various ways, with the creation of such security standards as Secure Socket Layer (SSL) and S/MIME. Both of these standards depend on digital certificates, which are at the core of Public/Private Key (PKI) encryption. SSL is often used to securely exchange data between a web browser and an Internet web server. It is a widespread standard since it fills a very clear security hole, and just as importantly, is very easy to implement and use. S/MIME is also a widespread standard, used mainly to secure email messages. But its dependence on unique digital certificates for both the sender and recipient has severely limited its acceptance by email users. With S/MIME, email senders and email recipients must obtain digital certificates and install them in their email client software. Then, the email sender must obtain copies of the Public keys of all of its message recipients, and digitally sign messages with the sender's Private key and each recipient's Public key. While this process produces a secure message exchange between the sender and its recipients, the burden on the sender and recipient has made it too complex for widespread acceptance.

To gain widespread acceptance, secure message delivery over the Internet must be made as technically unchallenging as possible, while still providing uncompromising data protection. Additional value can be added if the sender is notified when its recipients have opened their messages. Further value can be added if the receipt notification works in all cases, regardless of the recipient's email software (e.g. email client, web-based email, personal digital assistant). According to the method of the invention, such a "certified" message delivery system is provided which enables a message recipient to access its account, open its secure electronic mailbox, and quickly access one or more received messages. Upon the recipient opening a message, the system notifies the sender of that event.

In traditional e-mail systems, a user must initiate the account creation process, usually by requesting an account or joining an organization. This is often accomplished by the user visiting a website to fill out a registration form, or by an administrator creating an email address for one or more known users on a system managed by that administrator. Registered users are then assigned a unique email address on the system. In such systems, the user can then send and receive email messages using the assigned e-mail address.

In contrast to this well-established process, with the method of the invention, creation of a messaging account does not require user request, or action by an administrator in respect to a user joining an organization. Instead, new accounts are dynamically created by the system as a result of existing users of the system sending messages to unknown users of the system. Through this unique process, users that may have never had contact with the organization will receive unique password-protected accounts in the system.

Unlike traditional e-mail systems, where messages are delivered into the recipient's messaging system, messages transmitted according to the method of the invention are deposited into a unique account created for the recipient. The messages associated with the account are located on the same system where the message sender established its account. As a result, when the recipient accesses its account to retrieve a message, the system will always know that the message was opened, allowing it to provide the sender with confirmation of that event. In addition, since the message recipient accesses its private account on the system, all other messages sent to the recipient are available to the recipient in an Inbox. This is in contrast to existing message delivery systems. Typical messaging systems can only provide one message to the recipient since the system is based on a unique document ID, and not a unique recipient account. Having unique recipient accounts capable of displaying all received messages significantly increases the usability of the system. It allows the system to achieve the conveniences of conventional email systems, with the security and tracking capability of secure message delivery systems. The dynamic account creation process provided by this invention enables the messaging system to incorporate the benefits and conveniences of email and secure delivery systems. As a result, a messaging system built with this invention provides a unique, superior way to securely deliver and manage documents over the Internet.

The invention utilizes existing e-mail systems for notification of a secured certified message, but actual access is provided to the secured certified message from a database system located at the secured site. The access can be provided through a variety of mechanisms, including a local client, through the use of a web browser, and through the equivalent of plug-in features to existing e-mail systems. By using plug-in features to an existing e-mail system, the creation and access of a secured certified message can be seamless to an e-mail user.

The invention builds upon the fundamental Internet tools such as web browsers, email clients, the manner in which electronic mail is handled on the Internet, the Hypertext Markup Language (HTML), XML and the manner in which Uniform Resource Locators (URLs) work. A significant amount of material describing these features of the Internet is available both through various sites on the Internet and through published resources. Such resources and their applicability to the invention are discussed in the following description of the method and operation of the invention.

Dynamic account and mail store creation capabilities of an electronic document delivery system are among the Internet features utilized by the invention. In this arrangement, recipient accounts are dynamically created as a result of an electronic message being sent by the message sender, whether the sender is a registered user or an application that generates messages (e.g. eBilling, monthly statements). The electronic certified message takes on a familiar email format, and contains one or more individual or Group email addresses in To, CC and BCC fields, a Subject, Body and optionally, one or more file attachments. Recipient email addresses in the To, CC and BCC fields are checked in a case insensitive search against the email addresses of all registered and receive-only users in the system. If an addressed recipient's email address does not already exist, a new account is created for that address. The account is comprised of a unique system-generated user ID (NuID), a username consisting of the recipient's email address, an account password that is randomly generated, and a user type indicating that the addressed recipient is an unregistered receive-only user. The unique user ID (NuID) is used to individually link an account with user data in various database tables and the file system. A message store is also created for the recipient, and is based on the NuID for the recipient. The first certified message to the recipient (which triggers a receive-only account creation for the recipient), and all subsequent certified messages will then be deposited in the recipient's unique message store.

When a certified message is placed in the recipient's message store, a separate process generates a "mail waiting" email, and sends it via email to the recipient's email address. The "mail waiting" message contains a hypertext web link (hyperlink) pointing to the web server where the recipient's message delivery account can be accessed.

If the certified message is sent to a dynamically created "receive only" user, the "mail waiting" hyperlink will also contain the recipient's username and password as parameters. When the hyperlink is selected, the recipient's web browser will start and access the message system web site. The recipient's username and password are passed as parameters from the hyperlink to the login screen, which authenticates them against the user database and allows entry for the recipient into its account. Once granted entry into the account, the system allows the recipient to access its private message Inbox and retrieve one or more of its certified messages.

If the certified message is sent to the email address of a member that has already registered with the system (e.g. not a dynamically created member), then the "mail waiting" hyperlink will contain the recipient's username but not the password for the recipient. When the user selects the hyperlink, the user's web browser will be started and the message delivery login screen will be displayed. The recipient will then have to provide its login password (as supplied during the user registration) to access its account. Once granted entry into the account, the system allows the recipient to access its private Inbox and retrieve one or more of its certified messages. In addition, since the recipient is already registered with the system, additional features are available, including creating and sending new certified messages.

Method Steps for a Preferred Embodiment

Sequence Flow for Dynamic account creation initiated by a registered member using a web browser:

1. Registered member (member) starts its web browser and accesses the certified message web site (system).
2. Member selects the login web link and login to the system with member's username and password.
3. Member selects the "Create New Message" link.
4. System displays a form with email message fields including recipient fields (To, CC, BCC), Subject, Body and Attachments.
5. Member creates a certified message by filling out the various message fields. In the recipient fields, member provides one or more Internet email addresses in the form username@domain.com. In addition, member can access its address book and select email addresses and predefined Groups of email addresses that it has already created.
6. When ready, the member selects the "Send" button to send the certified message to the recipient(s).
7. The system performs a syntax check of all of the recipient email addresses, ensuring that they are formed as per Internet SMTP email standards. If one or more invalid email addresses are detected, the Send operation is canceled; the system displays an error message and redisplays the message for the member to correct the problem.
8. Upon successfully providing all valid email addresses, and filling out any other required fields such as Subject and Body, when the "Send" button is selected, the system will begin to process the certified message.
9. The system displays a screen that the certified message has been received, and the recipients will be notified that they have a certified message waiting. Unlike conventional email systems, where the recipients receive the sender's message via email, the member's certified message is saved to a database and its attachments, if any, are stored in the file system.
10. Member can then continue using the system and any of its features.
11. Please refer to "Polling Process" for the remaining steps.

Account Creation Polling Process

A process polls the message database at a set interval, searching for certified messages that have not yet been processed. Unprocessed messages have their MsgStatus field set to 1. When one or more of these messages are found, the following steps are taken:

1) The user database is opened, containing email addresses and registration information.
2) The certified message is opened from the message database, and the various recipient email address fields (To, CC, BCC) are accessed.
3) Each email address is checked for correct syntax. Improperly formed email addresses are discarded.
4) One by one, a search is performed, individually looking for each addressed recipient's email address in the email address table of the user database. Since Internet email addresses are case insensitive, the search is case insensitive.
5) If the email address is found in the database, the email address is skipped. The process then repeats step 4 until no more email addresses are found in the recipient fields of the message.
6) If a match is not found, a new "receive only" account must be created for the recipient.

Following are the Steps the System Performs to Dynamically Create this New Account a) The account initialization process is started. It is comprised of the following steps:
   i) The email address is assigned to a string variable named EMAILADDRESS. Any upper and lowercase characters are left as is, since subsequent searches on the email address will disregard the case of the characters.
   ii) A random password is generated for the account, consisting of 8 alphanumeric characters. It is then assigned to a string variable named PASSWORD. Alphanumeric characters consist of the letters A to Z, and 0 to 9. To ensure that new passwords do not fall into a pattern, the RANDOMIZE function is used, initialized with a numeric value representing the current date and time. Since the date and time are never the same, generating a random value using this method ensures that the computer can generate true random numbers. The computer's RND (random) function is then used to generate the actual random values for the password.
   iii) The system date is queried, and the current date and time are inserted into a string variable named DATECREATED.
   iv) A USERTYPE integer variable is assigned a value of 1. This value is a code used by the messaging system representing the send and receive privilege of the user. A value of 1 signifies that the account is allowed to receive messages, and that an account login is provided for user access to the messages. Furthermore, a value of 1 signifies that the user can access, display and delete its received messages, but cannot create and send new messages. If the "receive-only" user successfully registers with the messaging system at a later time, their USERTYPE account code will be set to 2 or higher, indicating that the user has both send and receive capability.

v) An SQL database statement is created with this information, and an SQL function is called that writes this information to the user database.

b) Upon adding the entry, the system returns an account ID (NuID) for the newly created user. This NuID is automatically created by the database, and is unique to this user. The user's NuID uniquely correlates the user's account with messages sent to the user and messages the user may generate, store and send.

7) The MsgStatus field of the Message is then set to 2, indicating that all recipient email addresses have been processed, and any new "receive only" accounts have been created.

Message Delivery Polling Process

An independent process polls the message database at a set interval, searching for certified messages that have had their email addresses processed into user accounts but have not yet had "mail waiting" email notices sent to the addressed recipients. These messages will have their MsgStatus field set to 2. When one or more of these messages are found, the following steps are taken:

1) Certified messages with a MsgStatus field set to 2 are accessed one at a time in the database
2) NoticeTimer Subroutine( )

```
Call NotificationMessage
Select Message where MsgStatus=1
If Not EOF then
Call ProcessMessage
ReadMessage (read message fields)
Increment Sender Messages Sent Counter
Syntax check Message Email Addresses
Store valid Email Addresses into an Array
For each Email Address in the Array
Call DoMessageStatus
Check if account exists for Email Address
If it does not exist:
    Set User Type flag to "Receive Only User"
    Generate random 8 character password for account
    Add a row into the user database
    New user's unique account # is generated and returned
      by the database
If it does exist:
    Retrieve user account # from user database
    Retrieve UserType field from database
    Retrieve UserName field from database
Insert message sender account #, message #, recipient
    account # and recipient email address into the MsgSta-
    tus database
Call DoMessageNotify
End If
Call DoMessageWaitingNotice
```

Rather than allowing access to a single message as an isolated event, the present invention allows a message recipient to view all messages sent to the recipient. After the message sender's message is processed by the system, and any receive-only accounts are created for new email addresses contained in the sender's message, each message recipient is notified via email that it has a message waiting. The email notice contains an embedded web link back to the message sender's messaging system. In addition, the link contains the recipient login information, including its account name and password. The account name uniquely identifies the recipient to the system, and is made up of its email address. By selecting this embedded web link in its email message, the recipient's web browser is launched. The recipient's account name and password are passed to the login screen of the message system's web server. The web server then authenticates the login against the user database. Upon successful login, the recipient is then provided access to its account. At this point, the recipient is guided to its private Inbox. This Inbox contains the sender's message for retrieval by the recipient. In addition, because the recipient has a unique account ID, any other messages sent to the recipient will also be displayed in the Inbox.

Implementation of Embodiments of the Invention

FIG. 1 illustrates a system implementation for two embodiments of the secure messaging system of the invention. It is noted that users operating under those embodiments can access the encrypted database simultaneously. In one of the embodiments, which is indicated as providing access to the system via a web browser 10, a secure web connection (SSL) is made via an HTTPS Internet connection 11 to a messaging web server 12. The browser 10 is used to communicate with the messaging web server 12, and can create and retrieve secure messages. The web server 12 writes and reads data from/to encrypted database 13 using an ODBC database connection. In the second embodiment, an XML parsing engine 22 is used to receive data, either from a "Send Certified" button 20 installed in an email client (via an SMTP Internet connection), or from an application 21 that generates XML files to be processed by the secure messaging system. The XML parsing engine 22 then writes data to the encrypted database 13 via an ODBC database connection.

One embodiment of the present invention is a method and system for the dynamic creation of user accounts and corresponding message store for the delivery of electronic messages. A message store is also created for these new user accounts, where one or more electronic messages can be retrieved. User account creation is accomplished by the action of an existing registered member or registered process. When an electronic message is sent to an unregistered user, the user is automatically registered with the system, a unique, password-protected account is created and assigned to the user, and a private mail store is created for the user. The electronic message is then deposited into the user's mail store for later retrieval by the user. This is in contrast to traditional electronic mail systems, which require a user to initiate a request for the creation of an account and mail store. Then, at a later time, the user can access its account and mail store to retrieve any deposited messages.

In another embodiment, the invention can provide a certified COD system. The secure, trackable nature of the CertifiedMail architecture can be applied in business-to-business, business-to-government, business-to-consumer, and consumer-to-consumer payment solutions. In such an embodiment, a seller registers with the CertifiedMail system. After registration, the seller can create an invoice on the system, provide payment details, and then furnish the email address of the buyer. The CertifiedMail system creates an inbox for the recipient if one does not already exist, deposits the sender's invoice into the inbox, and sends an email notice that the invoice is waiting to be accessed. When the recipient opens its message, the sender's invoice is displayed. The recipient is presented with the option of paying for the invoice through various payment types including credit card and check. Upon entering of the recipient's payment information, the CertifiedMail system performs the funds transaction. It then notifies the message sender that the payment has been received. The seller can then ship the purchased goods, or the CertifiedMail system can be instructed to enable the buyer to download the goods from the CertifiedMail message. At a regular interval, CertifiedMail will transfer the collected funds to the seller, minus any transaction fee.

In yet another embodiment, the invention can be used to provide long-term document escrow. The CertifiedMail system provides selectable message expiration periods, including the option of long-term document storage and retrieval. This enables a message to be retrieved after a significant time period for future reference. In addition, when a message is submitted to the system, a mathematical calculation of the message contents, such as Message Digest 5 (MD5), is performed. This calculation is associated with the message, and stored in the database. At a later time, when the message is accessed, the same calculation is performed on the message contents. If the calculation is equal to the value that was originally computed, then the message content is also proven to be identical. In practical use, this computation proves that the message retrieved is equal to the message that was submitted. This creates a system with long-term document retrieval and proof of authenticity.

In yet a further embodiment, the invention can provide secure digital product distribution. Traditional Internet shopping carts store a user's purchases for the duration of that Internet session. However, since digital downloads such as software and newsletters do not include a physical delivery, it is often useful for a purchaser to access its purchase again at a later time. This is especially true when a software purchaser's hard drive crashes, or a new operating system version is installed. The CertifiedMail system provides a repository for storing digital downloads, allowing the purchaser to easily retrieve all past purchases from the CertifiedMail inbox. Any previous or future "email waiting" notice sent by the system to the purchaser allows a secure opening of the purchaser's inbox, providing the purchaser with convenient access to all prior purchases, with the ability to verify each download's authenticity via an automatic digital checksum, and download the contents again.

Additionally, wireless devices are an increasingly popular way to browse the internet. Because of the unique nature of wireless communication, including limited bandwidth and screen display size, the web standard HTML language is not used by most wireless phones. New protocols, such as Wireless Application Protocol (WAP) and Hand-held Device Markup Language (HDML) address these unique characteristics, and are used to send and retrieve web-based information. A wireless interface to the CertifiedMail system enables secure delivery, trackable delivery of messages via the Secure Socket Layer (SSL) web security protocol, which is then converted by the wireless gateway to a secure wireless protocol such as Wireless Transport Layer Security (WTLS), extending the security to the individual wireless device. The CertifiedMail tracking system can detect either the phone number of the wireless device receiving the message, or the IP address assigned to the device.

Since faxes are a form of digital content, they can provide additional security in delivery and tracking beyond what is available via standard fax solutions. Faxes are converted to images, which are then added as attachments to a CertifiedMail message. The recipient is notified via email that a fax is waiting, and the CertifiedMail secure mechanism is used for the recipient to pickup the fax. The fax sender then knows that the fax has been retrieved via the CertifiedMail message tracking.

CertifiedMail provides a system approach to secure messaging, enabling end-to-end security and tracking of confidential messages. This approach makes it ideal for delivering stock trade confirmations, monthly statements and other sensitive financial documents. Because of its end-to-end secure approach, it can replace the requirement to physically print and mail via postal delivery such sensitive documents, significantly reducing the expense of transaction confirmation.

When a member of the CertifiedMail system sends a secure message, a new account may be created by the system for the recipient to pickup the message, or a previously created recipient's account will be used to deposit the new message. As is often the case with messages, the recipient may want to reply to the sender. The CertifiedMail system allows the recipient, who is not a member of its secure delivery system, to reply to the sender using the full security of the CertifiedMail system, thus providing secured two-way communications between the member and the message recipient. This extends the CertifiedMail message delivery security to recipients that were not registered on the system. It is ideal for many two-way communication scenarios including doctor to patient communication, lawyer to client communication, and any member to non-member communication.

Appendix A provides a description of one embodiment the database structures utilized to implement the secured certified message system. Appendix B contains an XML document representative of one embodiment of an external interface utilized with the database structures to provide an interface to other systems such as e-mail systems, intelligent agents and user clients.

In view of the foregoing description, numerous modifications and alternative embodiments of the invention will be apparent to those skilled in the art. Accordingly, this description is to be construed as illustrative only and is for the purpose of teaching those skilled in the art the best mode of carrying out the invention. Details of the structure may be varied substantially without departing from the spirit of the invention, and the exclusive use of all modifications, which come within the scope of the appended claim, is reserved.

APPENDIX A

CMUsr Database

Stores all user related information, including user registration and email address, user's address book and various statistics about the user.

userEmail table:

Stores unique email addresses for registered and non-registered users, and assigns unique account #s (NuID field) to each address. NuID is the common link between a user and messages they send and receive, along with various other related information such as their address book, preferences and payment information.

APPENDIX A-continued userEmail

| | Column Name | Datatype | Length | Precision | Scale | Allow N |
|---|---|---|---|---|---|---|
| (key) | NuID | int | 4 | 10 | 0 | |
| | emailAddr | varchar | 64 | 0 | 0 | |
| | userID | varchar | 20 | 0 | 0 | |
| | password | varchar | 10 | 0 | 0 | |
| | user Type | tinyint | 1 | 2 | 0 | |
| | dateCreated | smalldatetir | 4 | 0 | 0 | |
| | dateLastVisit | smalldatetir | 4 | 0 | 0 | |
| | numVisits | int | 4 | 10 | 0 | |
| | msgReceived | int | 4 | 10 | 0 | |

Key fields:

| | |
|---|---|
| NuID | Unique account # generated each time an email address record is added to the table |
| emailAddr | The email address of all message senders (registered users) and recipients. This field can only contain unique values. |
| userID | The username required to login to a particular message store. For receive-only accounts, this field is blank and their email address is used as the user name. |
| password | Along with a username, this password value must be provided to login to a user's account. |
| userType | Flag which indicates the status of the users, from receive only, free personal or paying |
| dateCreated | The current date and time that an email address record is added to the database |
| dateLastVisit | The date and time of the user's last login to the system |
| numVisits | The number of times the user has logged into the system |
| msgReceived | The number of messages received by the user |

users table:

Stores registered users information including name and address, and several system metrics fields.

users

| | Column Name | Condensed Type | Allow Null | Identity |
|---|---|---|---|---|
| (key) | NuID | int | | |
| | salutation | varchar(10) | ✓ | |
| | fName | varchar(25) | ✓ | |
| | mi | char(1) | ✓ | |
| | lName | varchar(25) | ✓ | |
| | companyName | varchar(45) | ✓ | |
| | title | varchar(30) | ✓ | |
| | phone | varchar(15) | ✓ | |
| | extension | varchar(6) | ✓ | |
| | address1 | varchar(50) | ✓ | |
| | address2 | varchar(30) | ✓ | |
| | city | varchar(25) | ✓ | |
| | state | char(2) | ✓ | |
| | province | varchar(12) | ✓ | |
| | zip | varchar(11) | ✓ | |
| | country | char(2) | ✓ | |
| | msgSent | int | ✓ | |
| | verified | tinyint | ✓ | |
| | accountsize | int | ✓ | |
| | prSent | int | ✓ | |
| | cobrand | varchar(8) | ✓ | |
| | cmplan | varchar(10) | ✓ | |
| | cmplus | int | ✓ | |
| | cmminus | int | ✓ | |
| | msgexp | int | ✓ | |
| | ca | int | ✓ | |
| | CoID | int | ✓ | |
| | Admin | bit | ✓ | |
| | AdminVerify | bit | | |
| | Registered | bit | | |

Key fields:

| | |
|---|---|
| NuID | Taken from the userEmail database, the NuID links the user's information |
| msgSent | Tracks total number of messages sent |
| verified | When a user registers with CertifiedMail, a message with an embedded web link is sent to their registered email address. By selecting the web link, the user shows that the email address they have provided is their actuai email address. When selected, their account is now activated and they can send CertifiedMail messages. |
| accountsize | indicates the space in Mb allocated for storage of the user's sent mail messages and attachments |
| cobrand | If a user was referred to the CertifiedMail site from a cobranding partner's site, the cobranding id of the partner's site will be written to this fieId. |
| cmplan | indicates which messaging plan the user has joined, enabling the system to activate or disable certain features, and control disk space usage limitations |
| cmplus | provides a mechanism to add additional features to the user's existing plan |
| cmminus | provides a mechanism to subtract features from a user's existing plan |
| msgexp | provides a default expiration period for messages created by the user |
| CoID | indicates the company id, if any, with which the user is associated |
| Admin | indicates whether the user is an administrator for other CertifiedMail user's in their company |

Address Book tables:

Stores address book information for each registered user

Key fields:

| | |
|---|---|
| NuID | Unique user account # |
| ELID | Unique email list # |

ABEmailList

| | Column Name | Condensed Type | Allow Nulls | Identity |
|---|---|---|---|---|
| (key) | ELID | int | | ✓ |
| | NuID | int | | |
| | fname | varchar(25) | ✓ | |
| | lname | varchar(25) | ✓ | |
| | company | varchar(35) | ✓ | |
| | emailAddr | varchar(64) | ✓ | |

ABGroupList

| | Column Name | Condensed Type | Allow Nulls | Identity |
|---|---|---|---|---|
| | GRID | int | | ✓ |
| | NuID | int | | |
| | name | varchar(40) | | |

ABGroupMember

| | Column Name | Condensed Type | Allow Nulls | Identity |
|---|---|---|---|---|
| | GmID | int | | ✓ |
| | GrID | int | | |
| | ELID | int | | |
| | NuID | int | | |

CMMSg Database

Stores message related information, including message recipients, subject, body and metrics. Also stores pointers to message attachment files.

Message table:

Stores all messages entered into the system

APPENDIX A-continued

| Message | | | | | |
|---|---|---|---|---|---|
| Column Name | Datatype | Length | Precisio | Scale | Allow Null |
| NmId | int | 4 | 10 | 0 | |
| NuID | int | 4 | 10 | 0 | |
| msgStatus | tinyint | 1 | 3 | 0 | |
| createTime | datetime | 8 | 0 | 0 | |
| createIP | varchar | 20 | 0 | 0 | |
| dateExpire | smalldateti | 4 | 0 | 0 | |
| subject | varchar | 80 | 0 | 0 | |
| fromEmail | varchar | 64 | 0 | 0 | |
| toEmail | varchar | 1024 | 0 | 0 | |
| ccEmail | varchar | 1024 | 0 | 0 | ✓ |
| bccEmail | varchar | 1024 | 0 | 0 | ✓ |
| body | text | 16 | 0 | 0 | ✓ |
| question | varchar | 64 | 0 | 0 | ✓ |
| answer | varchar | 16 | 0 | 0 | ✓ |
| msgsize | int | 4 | 10 | 0 | |
| numto | int | 4 | 10 | 0 | ✓ |
| numread | int | 4 | 10 | 0 | ✓ |
| anonymous | tinyint | 1 | 3 | 0 | |
| emailreceipt | tinyint | 1 | 3 | 0 | |
| priority | tinyint | 1 | 3 | 0 | |
| https | tinyint | 1 | 3 | 0 | |
| encrypt | tinyint | 1 | 3 | 0 | |
| checksum | varchar | 32 | 0 | 0 | ✓ |
| retract | tinyint | 1 | 3 | 0 | ✓ |

Key fields:

| | |
|---|---|
| NmId | Uniquely generated ID for this message |
| NuID | Account ID of user creating the message |
| msgStatus | Stores the status of the message (e.g, ready for processing, delete, retract) |
| createTime | Creation time of the message |
| createIP | IP address of the message creation |
| dateExpire | date that the message expires |
| subject | the Subject of the message |
| fromEmail | the email address registered by the user at the time the message is sent |
| toEmail | recipient To: list containing one or more email addresses, or name of an email address list group |
| ccEmail | recipient CC: list similar to the toEmail field |
| bccEmail | recipient BCC: list similar to the toEmail field. When a recipient picks up a message, following conventional email standards, the information in this field is not displayed |
| body | contains the body of the message |
| question | contains the text for an optional challenge/response hint. This text is displayed to the recipient when a message is password protected. |
| answer | contains the response to the challenge question required to open the message |
| msgsize | contains the size in bytes of the message contents including its attachments |
| numto | displays the number of emailaddress in the emailTo, emailCC and emailBCC fields |
| numread | displays the number of recipients that have read the message |
| anonymous | determines whether the sender's identity is included in the "message waiting" email notice sent to each recipient |
| emailreceipt | determines whether the system sends an "message read" email to the message sender when each recipient accesses the message |
| priority | sets the email priority of the "message waiting" email notice sent to each recipient |
| https | determines whether the recipient is forced to retrieve a message with an https (SSL encrypted) connection to the web server |
| encrypt | determines whether the message is encrypted when stored on the server |
| checksum | stores the MD5 checksum of the entire message when received by the system |
| retract | determines whether an unopened message has been retracted by the message sender, preventing the recipient from opening the message |

APPENDIX A-continued

MessageStatus table:

Stores tracking information for each recipient of each message

| MessageStatus | | | | | |
|---|---|---|---|---|---|
| Column Name | Datatype | Length | Precision | Scale | Allow Nulls |
| NmsID | int | 4 | 10 | 0 | |
| NmID | int | 4 | 10 | 0 | |
| NuID | int | 4 | 10 | 0 | |
| Ntold | int | 4 | 10 | 0 | |
| toEmail | varchar | 64 | 0 | 0 | |
| msgSent | tinyint | 1 | 3 | 0 | |
| dalNoOpen | tinyint | 1 | 3 | 0 | ✓ |
| openIP | varchar | 16 | 0 | 0 | ✓ |
| openTime | datetime | 8 | 0 | 0 | ✓ |
| errorSend | varchar | 50 | 0 | 0 | ✓ |
| msretract | tinyint | 1 | 3 | 0 | ✓ |

Key fields:

| | |
|---|---|
| NmsId | Unique id of each message status record in the table |
| NmId | Message id copied from the Message table |
| NuId | User account id copied from the useremail table |
| NtoId | Recipient account id copied from the useremail table |
| ToEmail | email address of one recipient tracked by this record |
| MsgStatus | determines the status of the message sent to this user (e.g. not opened, opened, deleted) |
| delNoOpen | determines whether the message was deleted without the recipient opening it |
| openIP | holds the IP address of the recipient's computer where the message was opened |
| openTime | holds the date and time that the recipient opened the message |
| errorSend | reserved for future use |
| msretract | determines whether the message sender has retracted the message before the recipient has opened it |

FileAttach table:

Tracks links between messages and their file attachments stored in the CertifiedMail database file system

| FileAttach | | | | | |
|---|---|---|---|---|---|
| Column Name | Datatype | Length | Precision | Scale | Allow Nulls |
| NmID | int | 4 | 10 | 0 | |
| NuID | int | 4 | 10 | 0 | |
| uname | varchar | 25 | 0 | 0 | |
| aname | varchar | 96 | 0 | 0 | |
| fsize | int | 4 | 10 | 0 | |

Key fields:

| | |
|---|---|
| NmID | copied from the Message table, this field links the file attachment record with a particular message |
| NuID | records which user created this file attachment |
| uname | unique name of the file attachment as stored in the CertifiedMail database file system |
| aname | the actual name of the flle as submitted to the system |
| fsize | the actual size of the file in bytes |

APPENDIX B

```
<?xml version="1.0" standalone="yes"?>
<!--Note: All data between tags must be Base64-encoded-->
<!DOCTYPE Contents [
    <!ELEMENT Contents (Internal, Message)+>
    <!ELEMENT Internal (Regcode+, CoBrand?, EmailReceipt?, SSL?)+>
    <!ELEMENT Message (To+, CC?, BCC?, From+, Subject+,
                        Body?, Attachments?)+>
    <!ELEMENT Attachments (Attachment*)?>
    <!ELEMENT Attachment (AttachName+, AttachFile+)?>
```

APPENDIX B-continued

```
    <!ELEMENT RegCode (#PCDATA)>
    <!ELEMENT CoBrand (#PCDATA)>
    <!ELEMENT EmailReceipt (#PCDATA)>
    <!ELEMENT SSL (#PCDATA)>
    <!ELEMENT To (#PCDATA)>
    <!ELEMENT CC (#PCDATA)>
    <!ELEMENT BCC (#PCDATA)>
    <!ELEMENT From (#PCDATA)>
    <!ELEMENT Subject (#PCDATA)>
    <!ELEMENT Body (#PCDATA)>
    <!ELEMENT AttachName (#PCDATA)>
    <!ELEMENT AttachFile (#PCDATA)>
]>
<Contents>
    <Internal>
        <RegCode/>
        <CoBrand/>
        <EmailReceipt/>
        <SSL/>
    </Internal>
    <Message>
        <To/>
        <BCC/>
        <From/>
        <Subject/>
        <Body/>
        <Attachments>
            <Attachment>
                <AttachName/>
                <AttachFile/>
            </Attachment>
            <Attachment>
                <AttachName/>
                <Attach File/>
            </Attachment>
        </Attachments>
    </Message>
</Contents>
```

What is claimed is:

1. A method for providing a secure transfer of data from a sender to a recipient, comprising the steps of:

transferring said data, including an address of at least one recipient, from said sender to a secure database server located in a network serving said sender;

upon said sender initiating a transfer of said data to said addressed recipient, causing an inquiry to be made as to whether said addressed recipient has an affiliation with said network;

upon a determination of no affiliation, causing said network to dynamically create an account for said addressed recipient, the account including a storage location and an identifier associating said addressed recipient with said storage location;

storing data addressed to said recipient in said storage location;

providing a notification to said addressed recipient of said addressed data being available at said secure database server; and transferring said addressed data to said addressed recipient upon a request from said addressed recipient.

2. The method of claim 1 wherein said transferred data is constituted as a text message.

3. The method of claim 1 wherein said notification to said addressed recipient is provided via electronic mail message to a non-network address of said addressed recipient.

4. The method of claim 1 including the further steps of:

providing account information in respect to said created account as part of said provided notification.

5. The method of claim 1 wherein said step of transferring said addressed data to said addressed recipient includes the substeps of:

causing said request from said addressed recipient to be directed to said storage location assigned to said addressed recipient, from which said addressed data may be accessed; and upon said addressed recipient accessing said addressed data at said assigned storage location, causing a notification of that occurrence to be provided to said sender.

6. The method of claim 1 wherein said transferred data is implemented to effect a certified COD system.

7. The method of claim 1 wherein said transferred data is implemented to provide a document escrow arrangement.

8. The method of claim 1 wherein said transferred data is implemented to provide secure, on-line product distribution.

9. The method of claim 1 wherein access to said network for said sender is provided via a wireless terminal.

10. The method of claim 1 wherein said the transferred data is constituted as a facsimile message.

11. The method of claim 1 wherein said transferred data is constituted as confidential financial information.

12. A method for providing a secure transfer of data from a sender to a recipient, comprising the steps of:

transferring said data, including an address of at least one recipient, from said sender to a secure database server located in a network serving said sender;

causing said secure database server to create a storage location for said addressed recipient, when no storage location previously exists for said recipient;

causing said secure database server to place data addressed to said recipient into the storage location assigned to said addressed recipient;

associating said recipient with said storage location via an identifier;

providing a notification to said addressed recipient of said addressed data being available at said secure database server, along with access information corresponding to said identifier for retrieving said addressed data therefrom;

transferring said addressed data to said addressed recipient upon a request from said addressed recipient; and maintaining said storage location and said identifier for subsequent data transfers.

13. The method of claim 12 wherein said step of transferring said addressed data to said addressed recipient includes the substeps of:

causing said request from said addressed recipient to be directed to said storage location assigned to said addressed recipient, from which said addressed data may be accessed; and upon said addressed recipient accessing said addressed data at said assigned storage location, causing a notification of that occurrence to be provided to said sender.

14. The method of claim 12 wherein said transferred data is constituted as a text message.

15. The method of claim 12 wherein said notification to said addressed recipient is provided via electronic mail message to a non-network address of said addressed recipient.

16. The method of claim 12 wherein said transferred data is implemented to effect a certified COD system.

17. The method of claim 12 wherein said transferred data is implemented to provide a document escrow arrangement.

18. The method of claim 12 wherein said transferred data is implemented to provide secure, on-line product distribution.

19. The method of claim 12 wherein access to said network for said sender is provided via a wireless terminal.

20. The method of claim 12 wherein said the transferred data is constituted as a facsimile message.

21. The method of claim 12 wherein said transferred data is constituted as confidential financial information.

22. In a network, a method of data transfer comprising the steps of:

upon a sender request to transfer email from the sender to a recipient, determining if a storage location associated with the recipient exists in the network;

if no storage location associated with the recipient exists, automatically creating a unique email account for the recipient, the email account including a storage location and an identifier associating the recipient with the storage location;

storing the email in the storage location; and maintaining said unique email account for subsequent data transfers.

23. The method of claim 22 further comprising the step of notifying the recipient of the email being available for retrieval and of information concerning the unique account.

24. The method of claim 23 wherein the recipient is notified via a non-network communication path.

* * * * *